United States Patent
Lee et al.

(10) Patent No.: US 10,175,877 B2
(45) Date of Patent: Jan. 8, 2019

(54) MOBILE TERMINAL AND METHOD FOR CONTROLLING THE SAME

(71) Applicant: LG ELECTRONICS INC., Seoul (KR)

(72) Inventors: Jieun Lee, Seoul (KR); Jihye Yu, Seoul (KR); Mijin Cho, Seoul (KR); Heesoo Kim, Seoul (KR); Eunyoung Noh, Seoul (KR); Jinwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 15/150,315

(22) Filed: May 9, 2016

(65) Prior Publication Data

US 2017/0090714 A1    Mar. 30, 2017

(30) Foreign Application Priority Data

Sep. 30, 2015    (KR) ........................ 10-2015-0138132

(51) Int. Cl.
*G06F 1/16*    (2006.01)
*G06F 3/041*   (2006.01)
(Continued)

(52) U.S. Cl.
CPC .......... *G06F 3/0488* (2013.01); *G06F 1/1626* (2013.01); *G06F 3/041* (2013.01);
(Continued)

(58) Field of Classification Search
None
See application file for complete search history.

(56) References Cited

U.S. PATENT DOCUMENTS

2005/0140661 A1* 6/2005 Collins ................. G06F 3/0482
                                                        345/173
2010/0269040 A1* 10/2010 Lee ..................... G06F 3/04817
                                                        715/702
(Continued)

FOREIGN PATENT DOCUMENTS

| EP | 2431870 | 3/2012 |
|----|---------|--------|
| EP | 2595043 | 5/2013 |
| WO | 2012081178 | 6/2012 |

OTHER PUBLICATIONS

European Patent Office Application Serial No. 16001573.1, Search Report dated Feb. 21, 2017, 11 pages.

(Continued)

*Primary Examiner* — Nitin Patel
*Assistant Examiner* — Amen W Bogale
(74) *Attorney, Agent, or Firm* — Lee, Hong, Degerman, Kang & Waimey PC

(57) ABSTRACT

Disclosed are a mobile terminal and a method for controlling the same. The mobile terminal may provide screen information for controlling various functions, in a held state in one hand. More specifically, the mobile terminal includes: a touch screen configured to sense a touch input; and a controller configured to control the touch screen to output screen information thereon, the screen information including a control area formed to have a preset size from a point on the touch screen to which a touch input has been applied, and including a plurality of sections for executing different functions based on reception of the touch input, wherein the controller controls the touch screen such that at least part of the plurality of sections moves within a preset distance from the control area, based on the touch input applied to the control area.

19 Claims, 18 Drawing Sheets

(51) Int. Cl.
*G06F 3/0481* (2013.01)
*G06F 3/0482* (2013.01)
*G06F 3/0484* (2013.01)
*G06F 3/0488* (2013.01)

(52) U.S. Cl.
CPC ........ *G06F 3/0482* (2013.01); *G06F 3/04817* (2013.01); *G06F 3/04842* (2013.01); *G06F 3/04883* (2013.01)

(56) References Cited

U.S. PATENT DOCUMENTS

2010/0302179 A1* 12/2010 Ahn .................. G06F 1/1618
                                                    345/173
2010/0306650 A1* 12/2010 Oh ..................... G06F 3/0482
                                                    715/702
2011/0193782 A1   8/2011 Shiu et al.
2013/0145316 A1*  6/2013 Heo .................... G06F 3/04817
                                                    715/810
2013/0222299 A1*  8/2013 Heo .................... G06F 3/0412
                                                    345/173
2013/0268897 A1* 10/2013 Li ...................... G06F 3/04886
                                                    715/841
2014/0075388 A1   3/2014 Friedrich et al.
2014/0143728 A1   5/2014 Coleman, Jr. et al.
2014/0298268 A1* 10/2014 Kang ................. G06F 3/04847
                                                    715/841
2015/0058808 A1   2/2015 Varkey et al.

OTHER PUBLICATIONS

Extended European Search Report issued by the National Institute of Industrial Property in France for Application No. 1657342, dated Aug. 31, 2018, 13 pages.

* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0138132, filed on Sep. 30, 2015, the contents of which are incorporated by reference herein in its entirety.

BACKGROUND OF THE INVENTION

1. Field of the Invention

The present invention relates to a mobile terminal, and more particularly, to a mobile terminal capable of controlling screen information based on a touch input and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

As functions executable in the mobile terminal becomes various and complicated, a user's need to be provided with the various functions more systematically is increased.

SUMMARY OF THE INVENTION

Therefore, an aspect of the detailed description is to provide a mobile terminal capable of providing screen information where functions executable in the mobile terminal are sorted based on a specific reference, and a method for controlling the same.

Another aspect of the detailed description is to provide a mobile terminal capable of providing a user interface to utilize the various functions in an easier and more convenient manner, using the screen information, and a method for controlling the same.

To achieve these and other advantages and in accordance with the purpose of this specification, as embodied and broadly described herein, there is provided a mobile terminal, including: a touch screen configured to sense a touch input; and a controller configured to control the touch screen to output screen information thereon, the screen information including a control area formed to have a preset size from a point on the touch screen to which a touch input has been applied, and including a plurality of sections for executing different functions based on reception of a touch input, wherein the controller controls the touch screen such that at least part of the plurality of sections moves within a preset distance from the control area, based on a preset touch input applied to the control area.

In an embodiment of the present invention, the plurality of sections may be formed in a preset number based on a preset reference, and the plurality of sections may be gradually formed in a direction which becomes far from the control area.

In an embodiment of the present invention, the controller may control the touch screen such that at least one object sorted based on the preset reference may be displayed on each of the plurality of sections. When a touch input applied onto the at least one object is received, the controller may execute a function related to the at least one object.

In an embodiment of the present invention, the at least one object may include at least one of an icon corresponding to an application executable in the mobile terminal, a widget corresponding to a specific function, a text or an image including specific information, and a graphic object including event-occurrence information.

In an embodiment of the present invention, the plurality of sections may include a first section closest to the control area, and a second section rather than the first section. The preset distance may be a distance from the control area to the first section.

In an embodiment of the present invention, when the preset touch input is applied onto the control area, the controller may control the touch screen such that positions of the first section and the second section may be interchanged with each other.

In an embodiment of the present invention, when the preset touch input is applied onto the control area, the controller may display the plurality of sections on the touch screen by reducing each of the plurality of sections by a preset size, such that all of the plurality of sections may be positioned within the preset distance.

In an embodiment of the present invention, the controller may control the touch screen such that summary information about a function related to each of the plurality of sections may be displayed on each of the reduced plurality of sections.

In an embodiment of the present invention, when a specific touch input is applied onto the control area, the controller may specify one of the plurality of sections, and may control the one section based on a touch input applied onto the control area after the one section has been specified.

In an embodiment of the present invention, a specific object for executing a function related to the one section may be displayed on the one section based on reception of a touch input. And the controller may control the touch screen such that another object included in the one section rather than the specific object may be output, based on a touch input of a preset direction applied onto the control area.

In an embodiment of the present invention, the another object may be related to one function among functions related to the one section. When a touch input is applied onto the control area in a state where the another object has been displayed, the controller may execute the one function related to the another object.

In an embodiment of the present invention, the controller may control the touch screen such that preview information of an execution screen by the execution of the one function related to the another object may be output to at least one region of the touch screen, while the touch input applied onto the control area in a state where the another object has been displayed is maintained.

In an embodiment of the present invention, information about a function related to the one section may be displayed on the one section. The controller may change a size of the one section based on a touch input applied onto the control area, and may control the touch screen such that an output state of the information about the function related to the one section may be changed as the size of the one section is changed.

In an embodiment of the present invention, the controller may enlarge the one section based on the touch input applied onto the control area, and may control the touch screen such that detailed information about the function related to the one section may be output based on an enlarged degree of the one section.

In an embodiment of the present invention, the controller may execute a specific function related to a section included within the preset distance, based on a consecutive touch input applied to the control area from the section included within the preset distance among the plurality of sections. And the controller may control the touch screen such that execution information by the execution of the specific function may be displayed on at least one section among the plurality of sections.

In an embodiment of the present invention, when the specific function corresponds to a specific application, the controller may control the touch screen such that sub menu information included in the specific application may be displayed on the plurality of sections, respectively.

To achieve these and other advantages and in accordance with the purpose of this specification, as embodied and broadly described herein, there is also provided a method for controlling a mobile terminal, including: outputting, to a touch screen, screen information including a control area formed to have a preset size from a point on the touch screen to which a touch input has been applied, and including a plurality of sections for executing different functions based on reception of the touch input; and controlling the touch screen such that at least part of the plurality of sections moves within a preset distance from the control area, based on the touch input applied to the control area.

In an embodiment of the present invention, the plurality of sections may be formed in a preset number based on a preset reference, and the plurality of sections may be gradually formed in a direction which becomes far from the control area.

In an embodiment of the present invention, the method may further include: controlling the touch screen such that at least one object sorted based on the preset reference is displayed on each of the plurality of sections; and when a touch input applied onto the at least one object is received, executing a function related to the at least one object.

In an embodiment of the present invention, the at least one object includes at least one of an icon corresponding to an application executable in the mobile terminal, a widget corresponding to a specific function, a text or an image including specific information, and a graphic object including event-occurrence information.

The mobile terminal and the control method thereof according to one embodiment of the present invention may have the following advantages.

Firstly, since various functions executable in the mobile terminal are provided to single screen information in a sorted manner based on a preset reference, a user may check the various functions at a glance through the screen information.

Secondly, the mobile terminal provides a user interface to control the various functions included in the screen information, while it is held in one hand of a user. Thus, the user may execute the various functions in an easier and more convenient manner.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
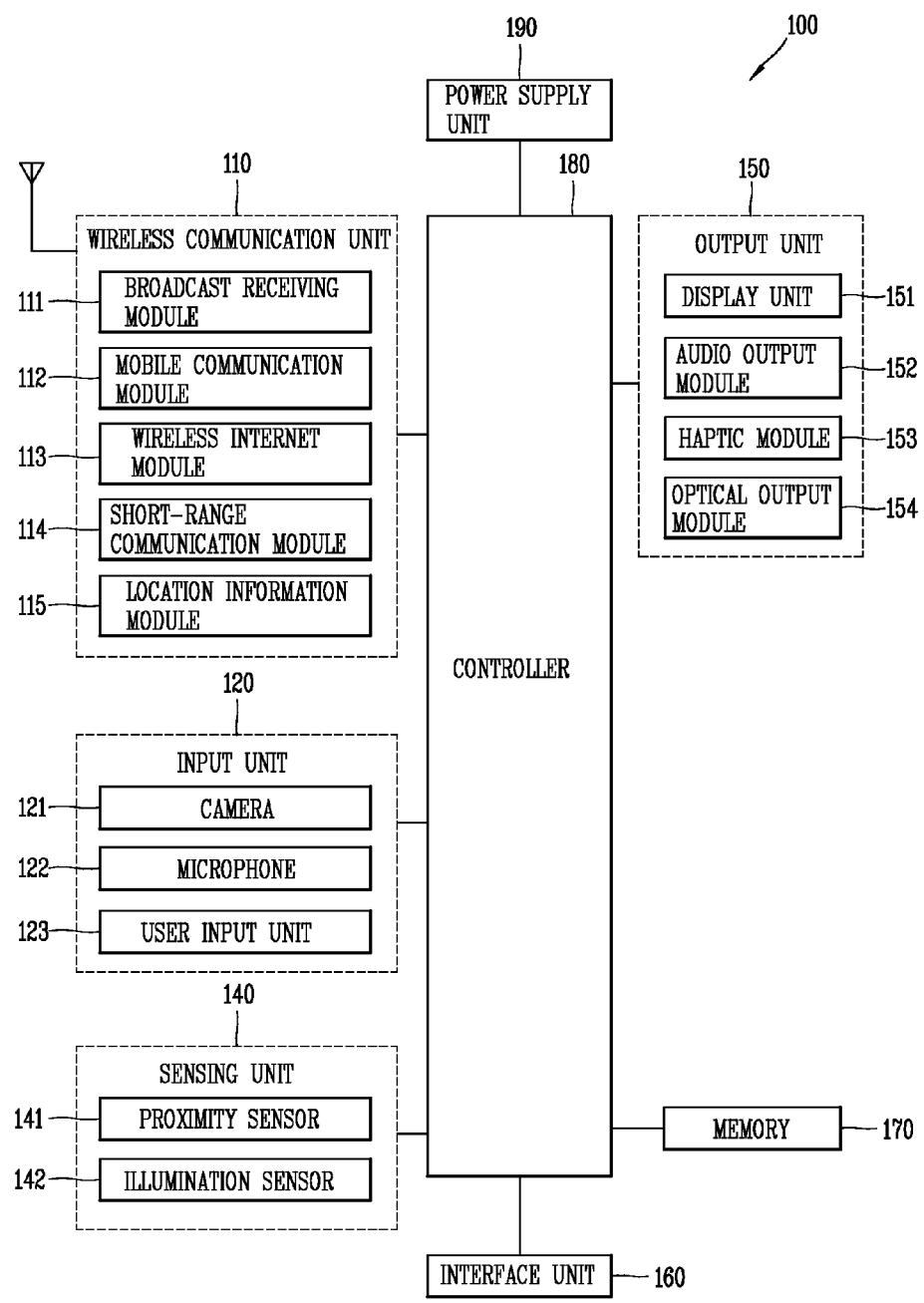
FIG. 1A is a block diagram for explaining a mobile terminal according to the present invention.
Figure 1B:
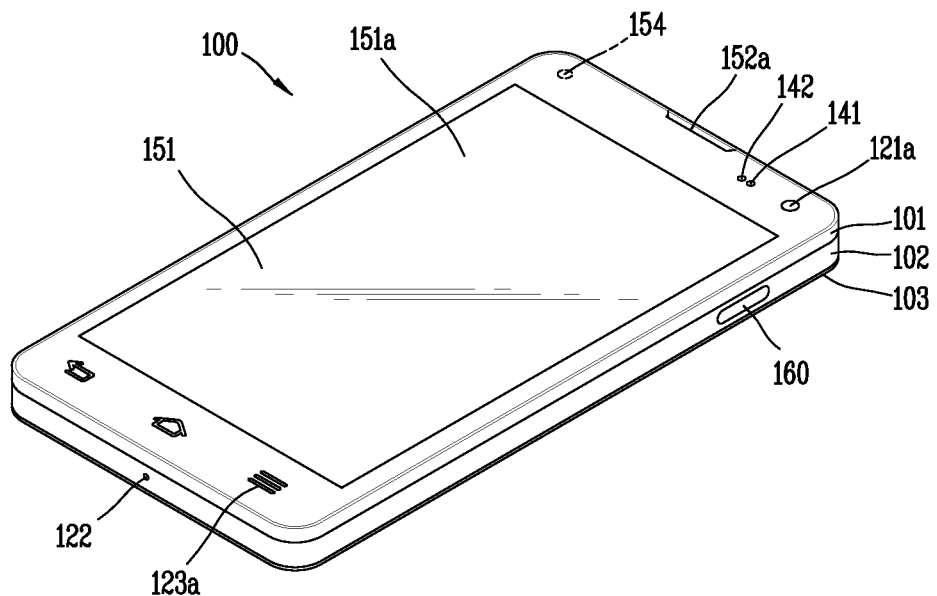
FIGS. 1B and 1C are conceptual views of a mobile terminal according to the present invention, which are viewed from different directions.
Figure 1C:
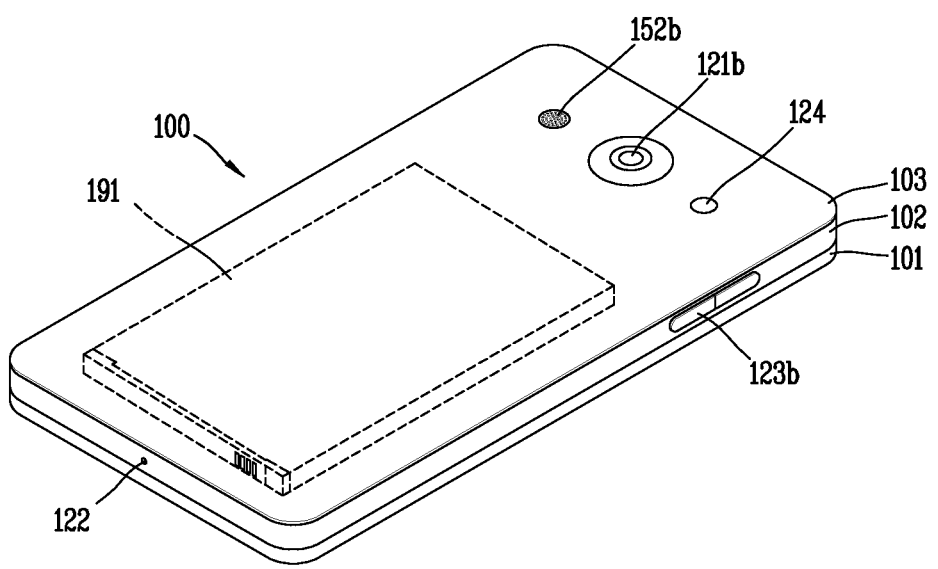

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A mobile terminal according to an embodiment of the present invention may provide screen information for easily utilizing various functions executable in the mobile terminal, with allowing a user to check the various functions at a glance.

More specifically, the screen information includes a plurality of sections corresponding to different functions classified according to a preset reference. A user may check information on the different functions at a glance, through the plurality of sections.

The screen information may include a control area with respect to the plurality of sections, and the control area is formed based on a point on a touch screen where a touch input has been applied. A user may easily utilize the different functions using the control area with holding the mobile terminal in one hand, by positioning the control area on a desired point on the touch screen.

Hereinafter, the mobile terminal according to an embodiment of the present invention will be explained in more detail with reference to the attached drawings.

Figure 2A:
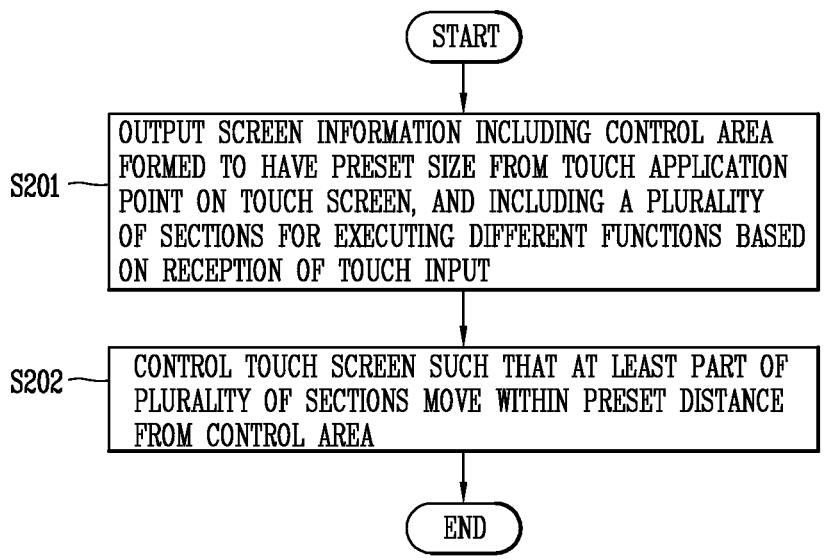
FIG. 2A is a flowchart illustrating a control method of a mobile terminal according to an embodiment of the present invention.
Figure 2B:
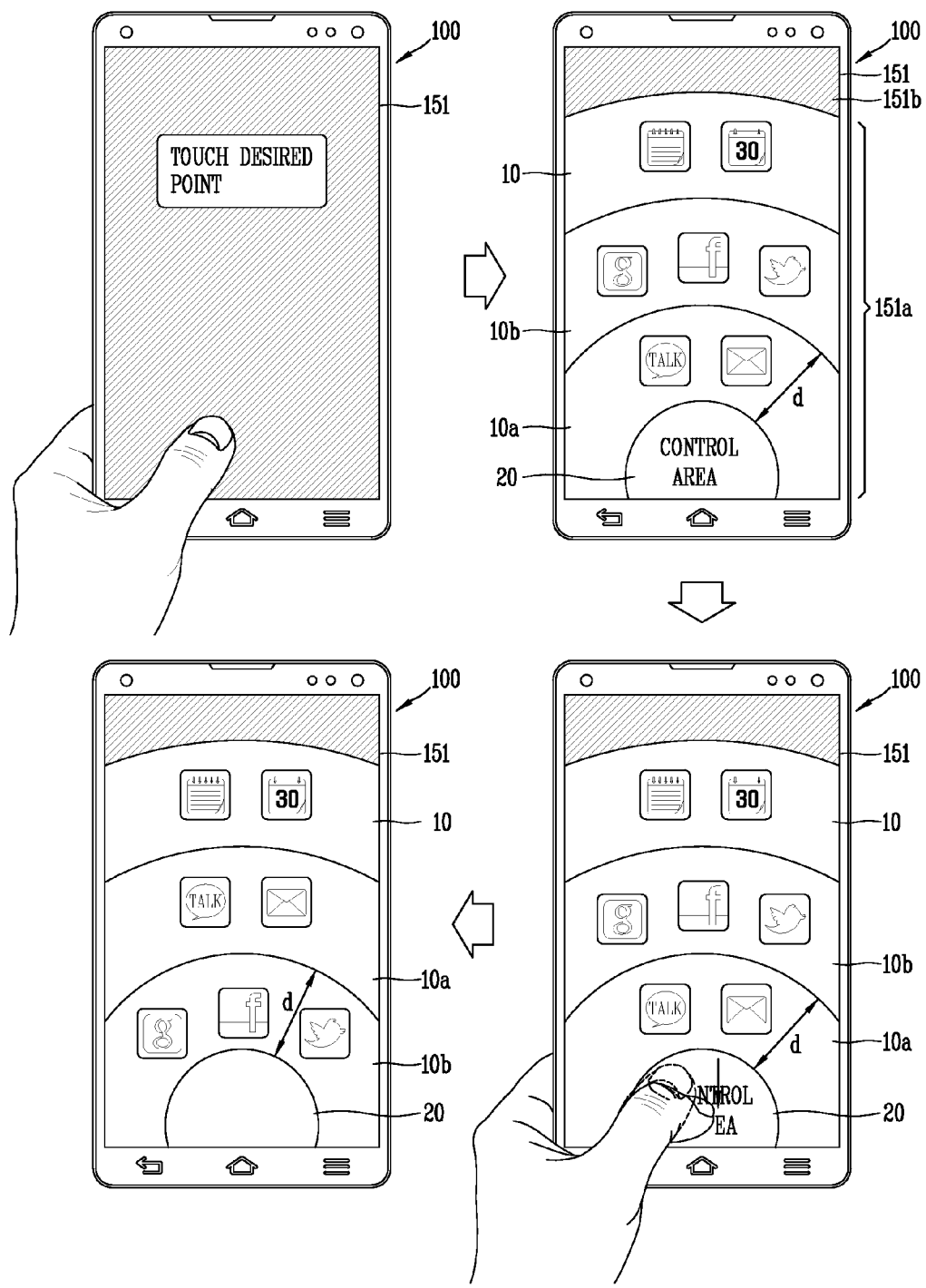
FIG. 2B is a representative view illustrating a control method of a mobile terminal according to an embodiment of the present invention.

FIG. 2A is a flowchart illustrating a control method of a mobile terminal according to an embodiment of the present invention, and FIG. 2B is a representative view illustrating a control method of a mobile terminal according to an embodiment of the present invention.

Referring to FIG. 2A, the mobile terminal 100 according to an embodiment of the present invention may include a touch screen 151 configured to sense a touch input applied thereto. The touch screen 151 may output preset screen information in an 'on' state of a lighting.

For instance, the preset screen information may include a lock screen for restricting execution of a function based on reception of a touch input, a home screen page that provides an icon of a preset application on a work space, an execution screen of a specific application, etc.

The mobile terminal 100 according to an embodiment of the present invention may output screen information for providing various functions executable in the mobile terminal 100 in a sorting manner. For instance, the screen information may be output when conditions (e. g., setting a specific mode to the mobile terminal 100, or inputting a preset control command) are satisfied. The controller 180 may control the touch screen 151 to output the screen information when the conditions are satisfied.

More specifically, the controller 180 may control the touch screen 151 to output screen information including a control area formed to have a preset size from a point on the touch screen 151 to which a touch input has been applied, and including a plurality of sections formed to execute different functions based on reception of the touch input (S201).

The control area indicates a region where a touch input for controlling the plurality of sections is received. A position of the control area may be determined based on a point on the touch screen 151 to which the touch input has been applied.

That is, if a touch input is applied onto a point on the touch screen 151 as shown in a first drawing of FIG. 2B, a control area 20 having a preset size may be formed based on the point on the touch screen 151, as shown in a second drawing of FIG. 2B.

The plurality of sections are formed on the remaining region excluding the control area among the screen information, and may correspond to different functions. That is, referring to the second drawing of FIG. 2B, the screen information 10 may be output to one region 151a of the touch screen 151, and another region 151b of the touch screen 151 may be a deactivated region where a lighting is turned off. The remaining region excluding the control area 20 among the screen information may include a plurality of sections 10a, 10b corresponding to different functions.

More specifically, the controller 180 may sort functions executable in the mobile terminal 100 based on a preset reference, and may correspond the sorted different functions to the plurality of sections. The preset reference may mean at least one category for sorting functions executable in the mobile terminal 100 from each other. The plurality of sections may have a preset number based on the preset reference.

For instance, the at least one category may include usage frequencies (number of times) with respect to functions executable in the mobile terminal 100. In this case, the controller 180 may set a plurality of steps based on the usage frequencies with respect to the functions, and may set a plurality of sections corresponding to the plurality of steps.

As another example, the at least one category may include a type of a function corresponding to an application. More specifically, the function corresponding to an application may include a search function, a wireless connection function with an external terminal or a server, a messenger function, etc. The controller 180 may check functions corresponding to applications executable in the mobile terminal 100, and may sort the checked functions into a preset number of types. The controller 180 may form sections having the preset number, and may associate applications corresponding to sorted functions with the sections.

As another example, the at least one category may include execution information of a specific function. More specifically, the execution information of a specific function may include information included in an execution screen of the specific function, information on a function executed together when the specific function is executed, information on a user's usage pattern when the specific function is executed, etc. The controller 180 may select a preset number of execution information from the execution information of the specific function, and may correspond the selected execution information to a preset number of sections.

The at least one category may include execution information of functions being currently executed in the mobile terminal 100, an application related to a specific function, etc. The controller 180 may select a preset number of categories based on the preset reference, and may correspond the selected categories to the preset number of sections, respectively. A process to form the plurality of sections will be explained in more detail with reference to FIGS. 3A to 3C.

The controller 180 may include at least one object sorted based on the preset reference, in each of the plurality of sections. The at least one object may be an object for executing a related function in response to reception of a touch input.

For instance, the at least one object may include at least one of an icon corresponding to an application executable in the mobile terminal 100, a widget corresponding to a specific function, a text or an image including specific information, and a graphic object including event-occurrence information.

The controller 180 may control the touch screen 151 to display the at least one object included in each of the plurality of sections, on each of the plurality of sections. That is, as shown in the second drawing of FIG. 2B, icons of applications related to functions corresponding to the plurality of sections 10a, 10b may be displayed on the plurality of sections 10a, 10b.

With such a configuration, a user may be provided with visual information about the functions corresponding to the plurality of sections, through the at least one object.

As aforementioned, the at least one object may execute a function related thereto based on reception of a touch input. The function related to the at least one object may be a function corresponding to a section including the at least one object, among the plurality of sections.

For instance, a type of a function corresponding to an application may be determined based on the preset reference, and one of the plurality of sections may be a section corresponding to a search function. An icon corresponding to an Internet application, a map application, etc. may be displayed on the section corresponding to a search function.

If a touch input is applied to the icon corresponding to the map application, the map application may be executed, and a route search function related to the search function of the one section may be executed.

The plurality of sections may be gradually formed in a direction which becomes far from the control area.

For instance, if the control area 20 is formed as a rounded region having a preset size as shown in FIG. 2B, the plurality of sections 10a, 10b may have a rounded shape gradually formed along a direction which becomes far from a point on the touch screen 151 to which a touch input has been applied, with enclosing the rounded region. In this case, the plurality of sections 10a, 10b may be arranged such that only one 10a of them may be close to the control area 20. The control area 20 may be separated from the remaining sections spatially, based on the one section 10a.

However, the present invention is not limited to the drawings. That is, the control area may be formed to have various shapes (e.g., a triangle or a quadrangle), and the plurality of sections may be also formed to have various shapes regardless of the shape of the control area. The plurality of sections may be arranged such that part or all thereof may be close to the control area, and each of the plurality of sections may have a different size and shape.

A touch input for controlling the plurality of sections may be applied to the control region. Controlling the plurality of sections may mean changing an output state of at least part of the plurality of sections, or executing functions corresponding to the plurality of sections.

More specifically, the controller 180 may change an output state of at least part of the plurality of sections, in response to a preset touch input applied to the control area.

For instance, the controller 180 may control the touch screen 151 such that at least part of the plurality of sections may be positioned within a preset distance from the control area, based on a preset touch input applied to the control area (S202).

The preset distance may be set as a maximum distance where a user's finger for applying a touch input can reach, in a state where the mobile terminal is held in one hand.

For instance, as shown in a third drawing of FIG. 2B, if a user applies a touch input to the touch screen 151 using a thumb, in a state where the mobile terminal is held in one hand, the preset distance may be a distance (d) from the control area to a point where the thumb can reach. In this case, the distance (d) may be determined based on a user's touch pattern with respect to the mobile terminal 100.

Once the preset distance is determined, the controller 180 may change an output state of the plurality of sections, such that at least part of the plurality of sections may be positioned within the preset distance.

More specifically, if the plurality of sections are formed so as to become distant gradually from the control area, a section closest to the control area among the plurality of sections may be defined as a first section, and a section rather than the first section among the plurality of sections may be defined as a second section. In this case, the preset distance may be a distance from the control area to the first section.

Upon application of a preset touch input to the touch screen 151, the controller 180 may control the touch screen 151 such that the positions of the first and second sections may be interchanged with each other. For instance, if a preset touch (e.g., a downward drag touch on the touch screen) is applied to the control area 20 as shown in the third drawing of FIG. 2B, the controller 180 may switch the positions of the first section 10a and the second section 10b from each other. That is, the second position 10b may be positioned within the preset distance (d) from the control area 20.

With such a configuration, a user may change an output state of the plurality of sections such that the second section may be positioned close to the control area, without directly touching the second section in order to execute a function corresponding to the second section. As a result, the user may easily execute the function corresponding to the second section while holding the mobile terminal 100 in one hand.

As another example, the controller 180 may change an output size, an output range, an output shape, a brightness, etc. of at least part of the plurality of sections, based on a preset touch input applied onto the control area.

That is, the controller 180 may enlarge or contract a size of at least part of the plurality of sections, based on the preset touch input. In this case, the controller 180 may change a size of the remaining sections excluding the at least part among the plurality of sections, in correspondence to the enlargement or contraction of the at least part.

The controller 180 may change the rounded shape of the at least part to a quadrangular shape, based on a preset touch input applied onto the control area. Alternatively, the controller 180 may change a brightness of the at least part, based on a preset touch input applied onto the control area.

The controller 180 may change an output state of at least part of the plurality of sections, based on a preset touch input applied to the control area. And the controller 180 may also change an output state of information, an object, etc. displayed on the at least part, as the output state of the at least part is changed. This will be explained in more detail with reference to FIGS. 4A to 4C. Thus, a user may easily check and utilize additional information or detailed information related to a function corresponding to the at least part, using the control region.

Once a preset touch input is applied onto the control area, the controller 180 may execute a function corresponding to at least part of the plurality of sections.

For instance, the controller 180 may execute a function corresponding to at least part of the plurality of sections, based on a preset touch input applied onto the control area. More specifically, the controller 180 may specify one of the plurality of sections based on the preset touch input, and may execute a function related to the specific section or may terminate the function being executed.

Thus, a user may easily control a function corresponding to a section far from the control area, by utilizing the control area, without directly applying a touch input to the one section among the plurality of sections.

In the mobile terminal according to an embodiment of the present invention, a user may execute various functions with holding the mobile terminal in one hand, or may easily check information related to the various functions.

As aforementioned, the controller 180 may determine a preset reference using at least one category, and may form a predetermined number of sections based on the preset reference.

Figure 3A:
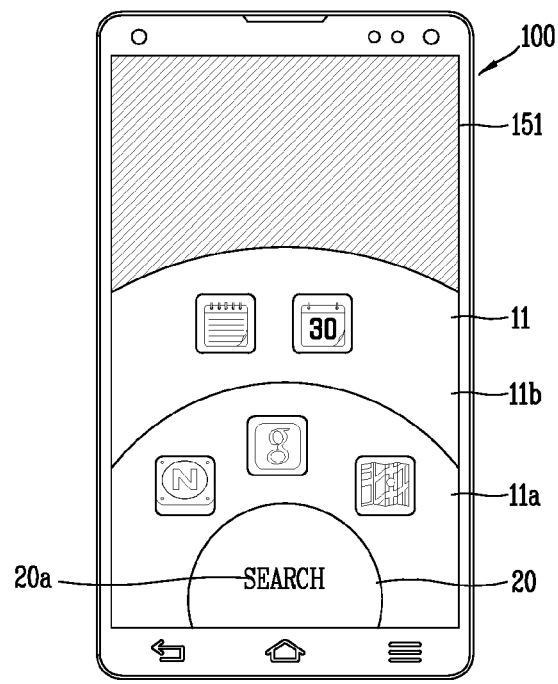
FIGS. 3A to 3C are views illustrating an embodiment to form a plurality of regions based on a preset reference.
Figure 3B:
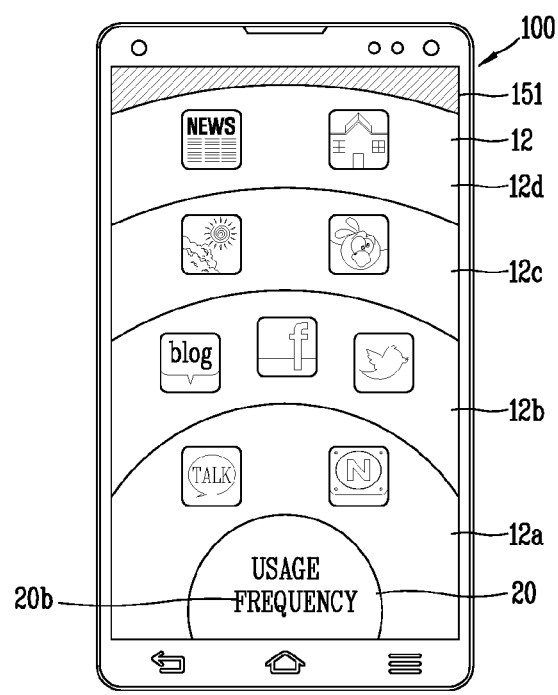
Figure 3C:
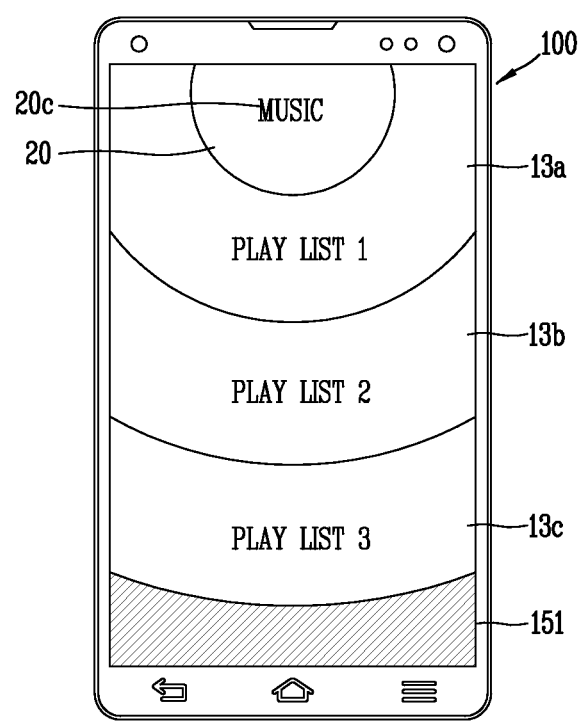

FIGS. 3A to 3C are views illustrating an embodiment to form a plurality of regions based on a preset reference.

The mobile terminal according to an embodiment of the present invention may sort all types of functions executable in the mobile terminal 100, based on a preset reference. For convenience, functions corresponding to applications executable in the mobile terminal 100, among all types of functions executable in the mobile terminal 100, will be explained.

Referring to FIG. 3A, the controller 180 may determine a specific function (e.g., a search function) based on a preset reference. And the controller 180 may display information 20a about the preset reference, on the control area 20.

The controller 180 may select an application related to the search function, among applications executable in the mobile terminal 100. For instance, the controller 180 may select an application for executing a search function (e.g., an Internet search application, a map application for route search, etc.). And the controller 180 may select an application for searching specific information (e.g., a schedule application for searching specific information, an application for searching memo information, etc.).

Upon selection of the application related to the search function, the controller 180 may form a section 11a related to the application related to the search function, and a section 11b related to an application which utilizes the search function in order to output specific information. The controller 180 may control the touch screen 151 to output screen information 11 including the plurality of sections 11a, 11b and the control area 20, on one region of the touch screen 151.

Referring to FIG. 3B, the controller 180 may determine a usage frequency (number of times) with respect to an application, as the preset reference. And the controller 180 may control the touch screen 151 to display information 20b about the preset reference, on the control area 20.

The controller 180 may check execution frequencies (number of times) of the applications at preset time intervals. The controller 180 may set a preset number of steps based on the checked execution frequencies, and may control each step to include at least one application.

That is, as shown in FIG. 3B, if four steps are implemented based on the usage frequencies, the controller 180 may form a plurality of sections 12a, 12b, 12c, 12d corresponding to the four steps. And the controller 180 may control the touch screen 151 to display icons of applications included in each of the plurality of sections 12a, 12b, 12c, 12d.

As another example, the preset reference may be execution information of a specific function. In this case, the controller 180 may display information 20c about the specific function (music play function) on the control area 20.

The controller 180 may sort execution information about the music play function (e.g., information about lists of playable music), into a preset number. And the controller 180 may form sections 13a, 13b, 13c corresponding to the preset number.

Referring to FIG. 3C, the control area 20 may be formed on an upper end of the touch screen 151. That is, when a touch input is applied to the upper end of the touch screen 151, the screen information may be output to one region on the upper end of the touch screen 151. Thus, a user may output the screen information to a desired region on the touch screen 151, and may utilize the output screen information.

The mobile terminal 100 of the present invention may provide a user with various functions executable in the mobile terminal 100, based on the preset reference.

Hereinafter, an embodiment to control at least part of the plurality of sections using the control area will be explained.

Figure 4A:
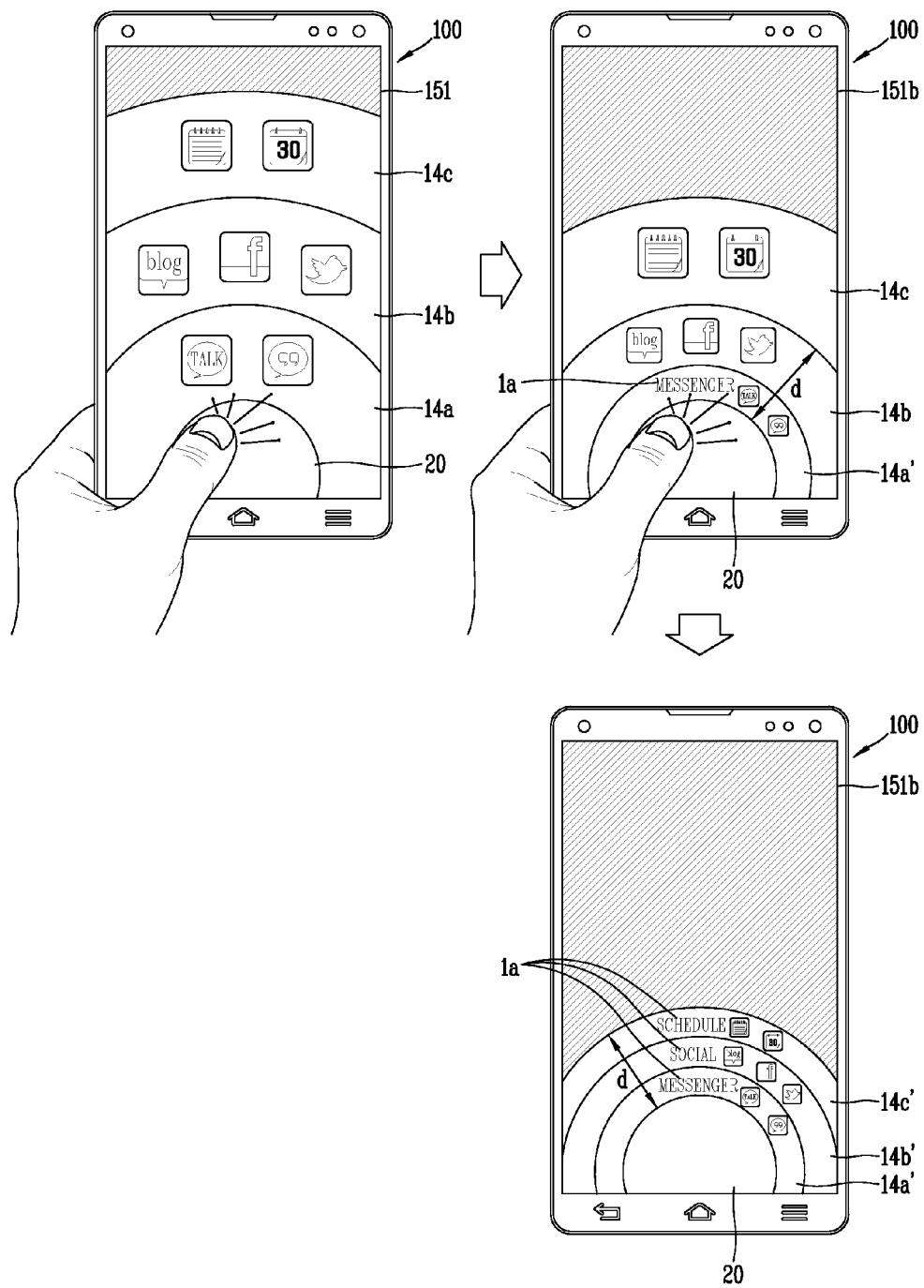
FIGS. 4A to 4C are views illustrating an embodiment to change an output state of at least part of a plurality of sections, based on a touch input applied to a control area.
Figure 4B:
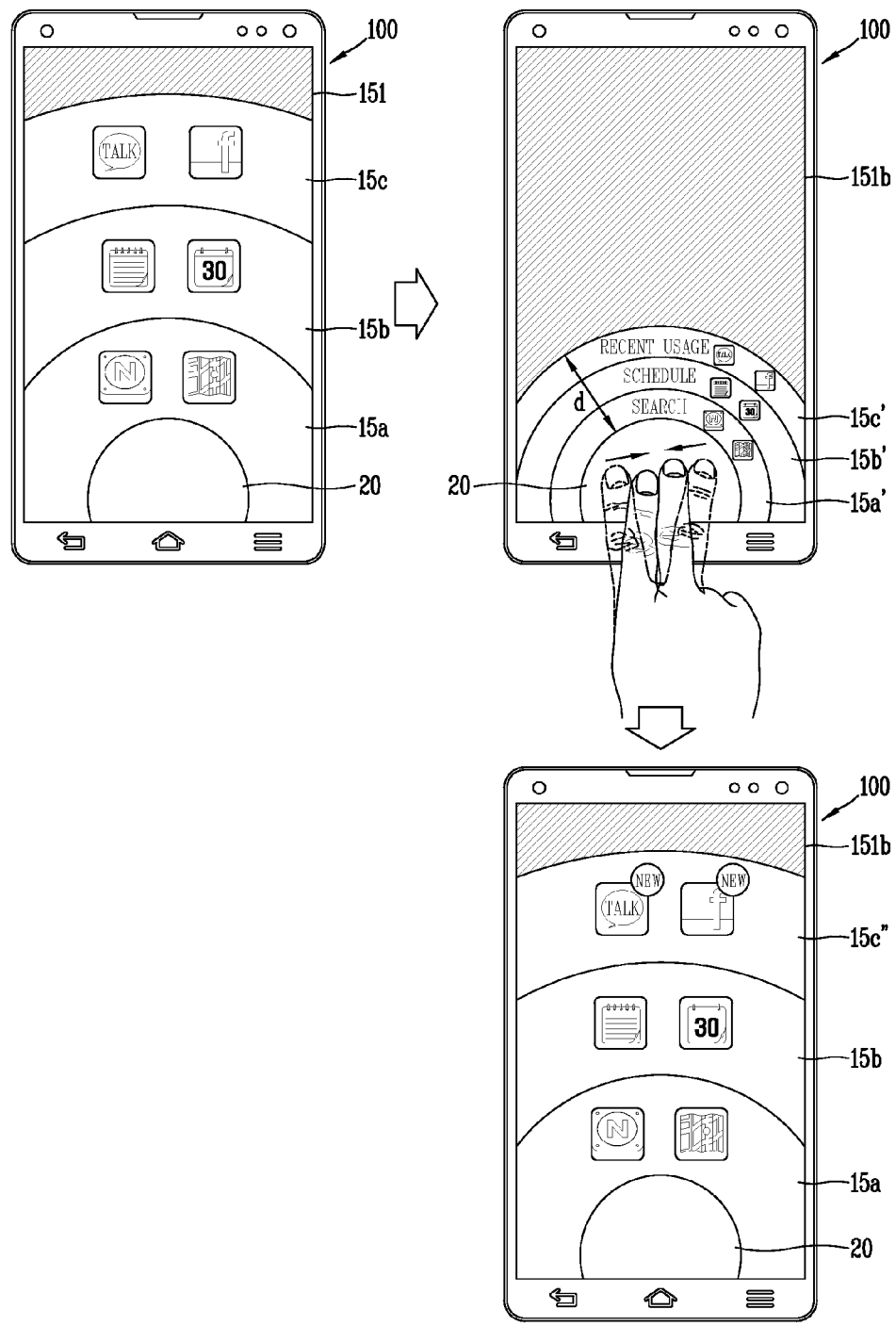
Figure 4C:
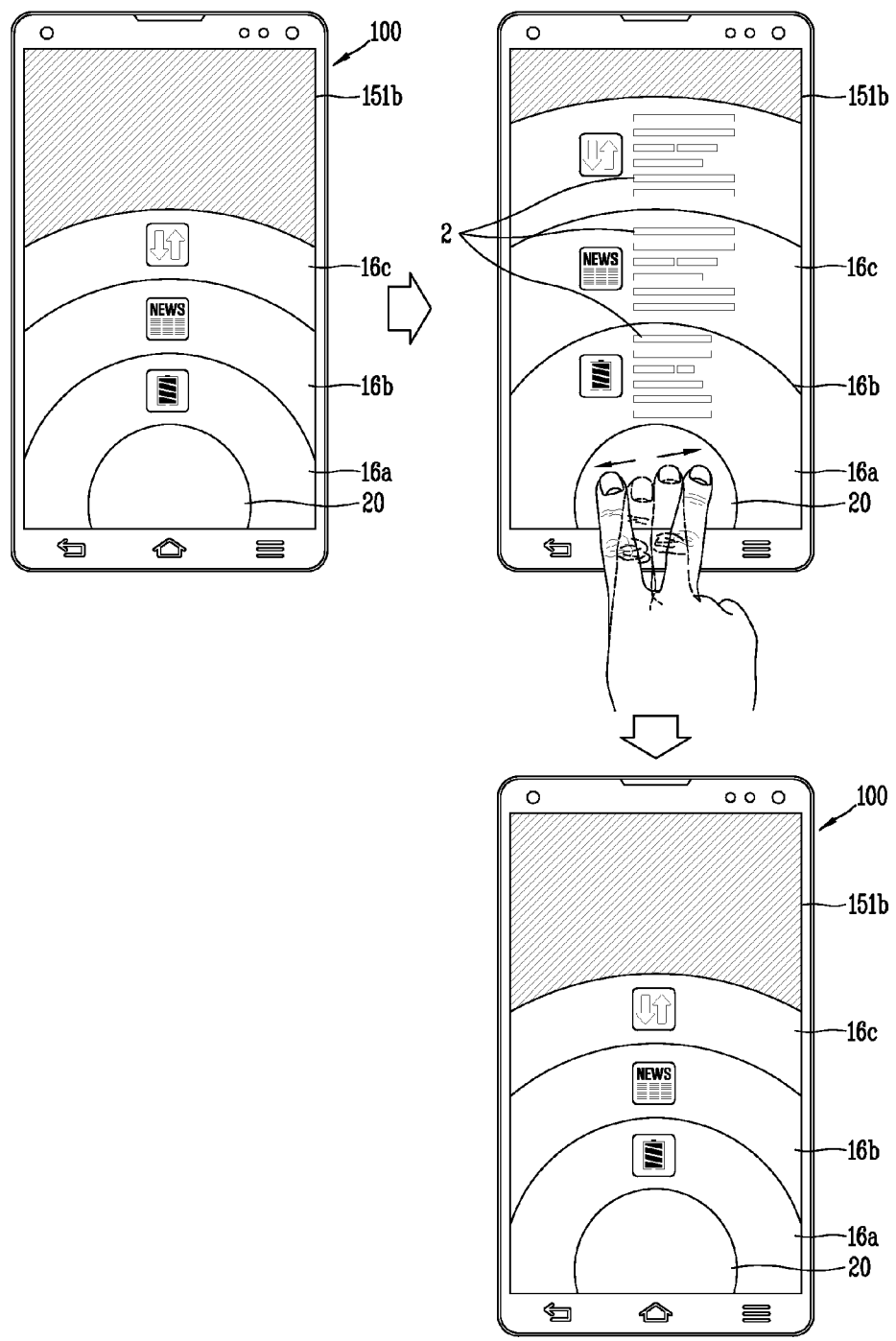

FIGS. 4A to 4C are views illustrating an embodiment to change an output state of at least part of a plurality of sections, based on a touch input applied to the control area.

Referring to FIG. 4A, screen information including the control area 20 and a plurality of sections 14a, 14b, 14c may be output to the touch screen 151. The plurality of sections may be divided from each other in a direction which becomes far from the control area 20. The plurality of sections 14a, 14b, 14c may be arranged such that only one 14a of the plurality of sections 14a, 14b, 14c may be close to the control area 20.

If a preset touch input (e.g., a preset number of tap inputs) is applied onto the control area 20, the controller 180 may control the touch screen 151 such that an output state of at least one of the plurality of sections 14a, 14b, 14c may be changed.

For instance, as shown in a second drawing of FIG. 4A, the controller 180 may control the touch screen 151 such that the section 14a close to the control area 20 among the plurality of sections 14a, 14b, 14c, and the next section 14b adjacent to the section 14a may be positioned within a preset distance (d) from the control area 20.

In this case, as shown in the second drawing of FIG. 4A, the section 14a may be reduced by a preset size, and objects displayed on the section 14a may be also reduced in size. The controller 180 may control the touch screen 151 such that summary information 1a about a function corresponding to the section 14a may be displayed on the reduced section 14a'.

In this state, if the preset touch input is applied to the control area 20, as shown in a third drawing of FIG. 4A, the controller 180 may output the plurality of sections 14a, 14b, 14c to the touch screen 151 after reducing each of plurality of sections 14a, 14b, 14c by a preset size, such that the plurality of sections 14a, 14b, 14c may be positioned within the preset distance (d).

The controller 180 may control the touch screen 151 such that summary information 1a about functions related to the plurality of sections 14a, 14b, 14c may be displayed on the reduced sections 14a', 14b', 14c'.

As another example, in a state where screen information including the control area 20 and a plurality of sections 15a, 15b, 15c has been output to the touch screen 151 as shown in a first drawing of FIG. 4B, a preset touch input may be applied onto the control area 20 as shown in a second drawing of FIG. 4B. The preset touch input may be a pinch-in touch input that two touches applied to two points spaced from each other are dragged toward directions which become closer to each other.

In this case, the controller 180 may control the touch screen 151 such that all of the plurality of sections 15a, 15b, 15c may be positioned within the preset distance (d), based on the preset touch input. The controller 180 may control the touch screen 151 such that an output state of a plurality of reduced sections 15a', 15b', 15c' may be maintained, while the preset touch input is maintained.

Then, as shown in a third drawing of FIG. 4B, if the preset touch input is released, the controller 180 may control the touch screen 151 such that the plurality of sections 15a, 15b, 15c may restore the original size.

If there is an application where a new event has occurred among applications included in each of the plurality of sections 15a, 15b, 15c, the controller 180 may display the event-occurred application in a differentiated manner.

For instance, as shown in a third drawing of FIG. 4B, if a new event has occurred from applications included in one section 15c of the plurality of sections 15a, 15b, 15c, the controller 180 may control the touch screen 151 such that the section 15c is changed into a section 15c'' where information indicating the occurrence of the new event has been displayed.

The mobile terminal 100 according to an embodiment of the present invention may execute a refresh function based on a preset touch input applied onto the control area 20.

As another example, referring to FIG. 4C, in a state where at least one object has been displayed on each of a plurality of sections 16a, 16b, 16c, a preset touch input may be applied onto the control area 20 as shown in a second drawing of FIG. 4C. The preset touch input may be a pinch-out touch input that two touches applied to two points spaced from each other are dragged toward directions which become far from each other.

Once the preset touch input is applied onto the control area 20, the controller 180 may display Once the preset touch input is applied onto the control area 20, the controller 180 may display the plurality of sections 16a, 16b, 16c in an enlarged manner by a preset size. And the controller 180 may control the touch screen 151 such that detailed information 2 about the at least one object included in each of the plurality of sections 16a, 16b, 16c may be displayed, in response to the enlargement of the plurality of sections 16a, 16b, 16c.

The controller 180 may control the touch screen 151 such that the detailed information 2 may be displayed on each of the plurality of sections 16a, 16b, 16c while the preset touch input is maintained. Thus, when the preset touch input is released, the plurality of sections 16a, 16b, 16c may restore the original output state as shown in a third drawing of FIG. 4C.

An output state (size, position, etc.) of at least part of the plurality of sections may be changed based on various touch inputs applied onto the control area. As the output state of the at least part of the plurality of sections is changed, the controller 180 may provide additional information, summary information or detailed information about a function corresponding to the at least part. Thus, a user may easily check various information related to the function corresponding to the at least part of the plurality of sections, by utilizing the control area.

The controller 180 may specify one of the plurality of sections based on a touch input applied onto the control area, and may execute a control related to the one section.

Figure 5A:
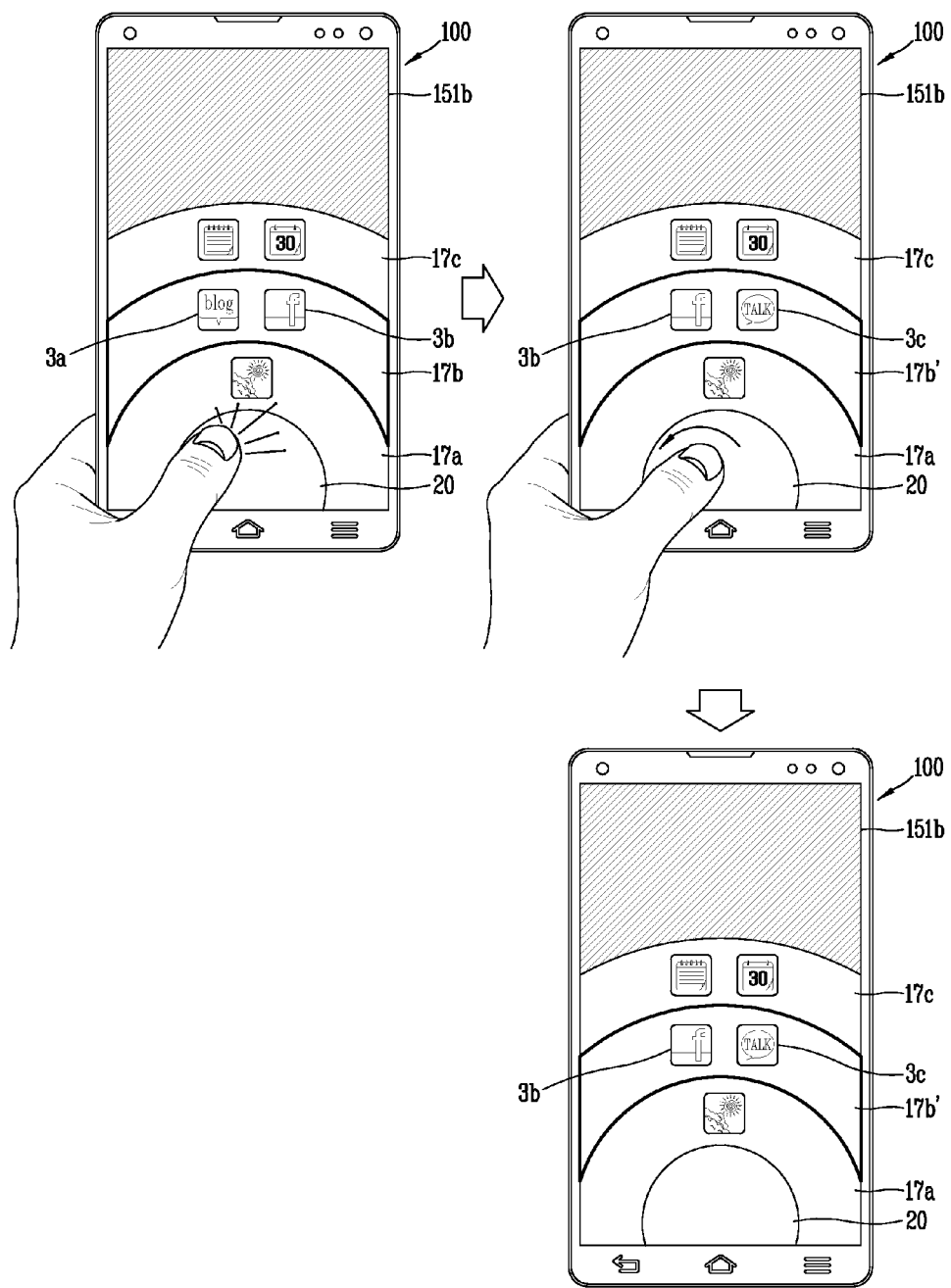
FIGS. 5A and 5B are views illustrating an embodiment to control one section specified among a plurality of sections, based on a touch input applied to a control area.
Figure 5B:
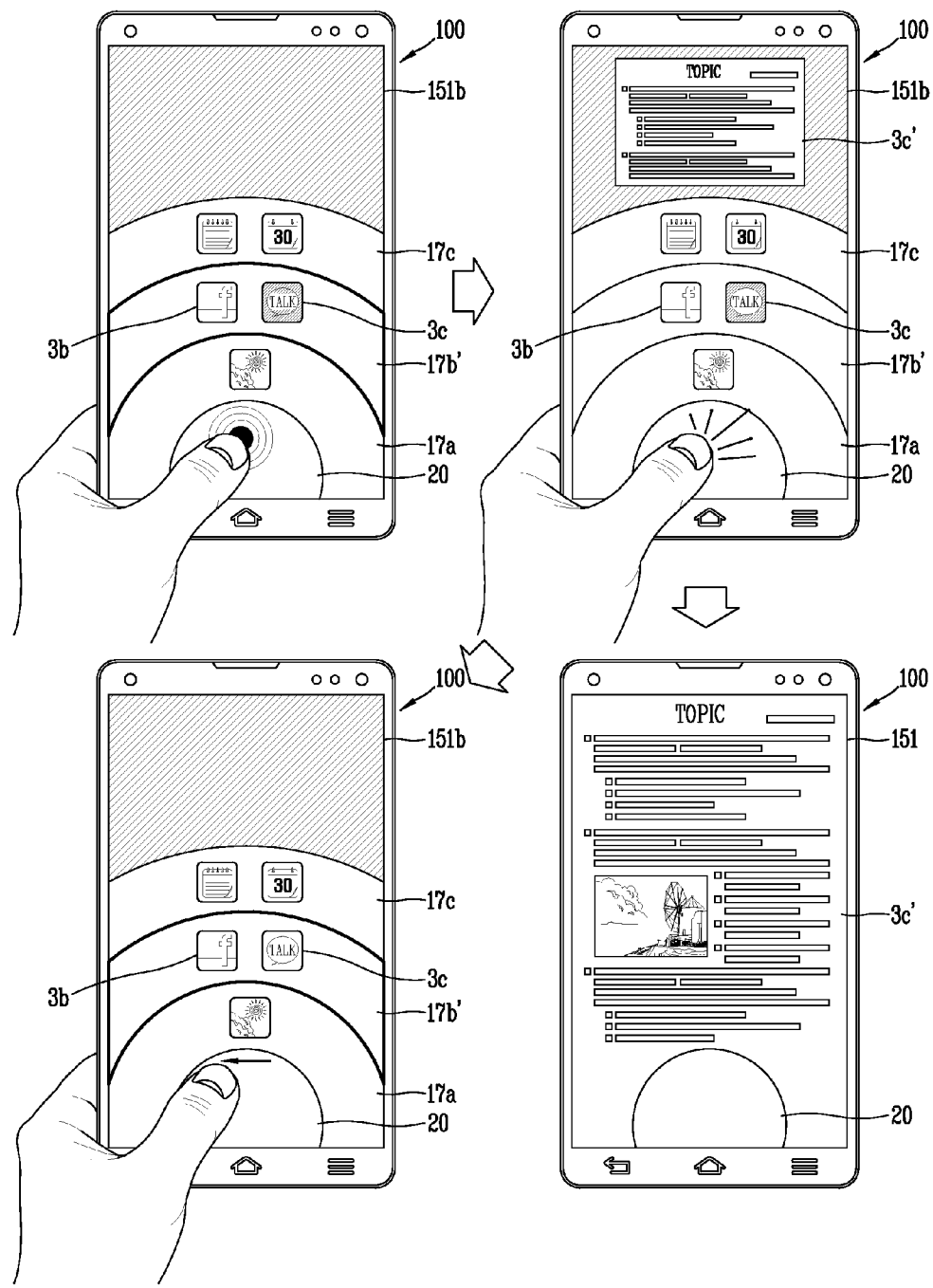

FIGS. 5A and 5B are views illustrating an embodiment to control one section specified among a plurality of sections, based on a touch input applied to the control area.

Referring to FIG. 5A, if a specific touch input is applied onto the control area 20, the controller 180 may specify one of the plurality of sections. The specified one section may be determined based on the specific touch input. For instance, when the specific touch input is a preset number of touch inputs, the controller 180 may specify a section spaced from the control area 20 by a number corresponding to the preset frequency (number of times), as the specified section.

Upon selection of the one section, the controller 180 may control the one section, based on a touch input applied onto the control area after the one section has been selected (specified). For instance, the controller 180 may control the touch screen 151 such that an object displayed on the one section may be changed, based on a touch input applied onto the control area after the one section has been selected (specified).

More specifically, as shown in FIG. 5A, on one section 17b, may be displayed at least one object 3a, 3b for executing a function related to the one section 17b based on reception of a touch input. As shown in a second drawing of FIG. 5A, if a touch input of a preset direction is applied onto the control area 20, the controller 180 may control the touch screen 151 such that the specific object 3a displayed on the one section 17b may be changed into another object 3c included in the one section 17b.

The touch input of a preset direction may be a rotation touch gesture applied in a clockwise or counterclockwise direction. The controller 180 may form the control area and the plurality of sections in a rounded shape, and may control an output state of the one section based on the rotation touch gesture. Thus, a user may be provided with an interesting visual effect to rotate a disc corresponding to the one section, by applying the rotation touch gesture to the control area.

The controller 180 may control the touch screen 151 such that only a predetermined number of objects among a plurality of objects may be displayed on the one section, even if the one section includes the plurality of objects. Thus, as shown in a third drawing of FIG. 5A, if the rotation touch gesture is released, only a preset number of objects (two objects) 3b, 3c may be displayed on the one section 17b'.

As another example, referring to FIG. 5B, the controller 180 may specify the object 3c, based on a touch input (e.g., a long touch maintained for more than a preset time) applied onto the control area 20 in a state where the object 3c has been displayed. As shown in a first drawing of FIG. 5B, the controller 180 may control the touch screen 151 such that the specified object 3c may be displayed in a differentiated manner.

As shown in a second drawing of FIG. 5B, if a preset touch input (e.g., a preset number of touch inputs) is applied onto the control area 20, the controller 180 may output preview information 3c' on at least part of the touch screen 151, the preview information about an execution screen for executing a function related to the object 3c. The at least part of the touch screen 151 is a region where the screen information has not been output, which may be a deactivated region where a lighting has been turned off.

The controller 180 may control the touch screen 151 such that the preview information 3c' may be maintained while the preset touch input is maintained. That is, as shown in a third drawing of FIG. 5B, if the preset touch input is released, the controller may execute a function related to the object 3c, and may control the touch screen 151 such that an execution screen 3c' by the execution of the function may be output. In this case, the controller 180 may control the touch screen 151 such that an output state of the execution screen 3c' and the control area 20 may be maintained, for reception of a touch input for re-outputting the screen information.

As shown in a fourth drawing of FIG. 5B, if the preset touch input is released after being moved within a preset range on the control area 20, the controller 180 may control the touch screen 151 such that the output state of the preview information 3c' may not be maintained any longer.

Thus, a user may firstly check preview information about an execution screen for executing a function related to the one section, before executing the function. Then, the user may determine whether to execute the function or not. This may enhance a user's convenience.

Hereinafter, an embodiment to change an output state of a plurality of sections, and to execute a function related to part of the plurality of sections will be explained.

Figure 6A:
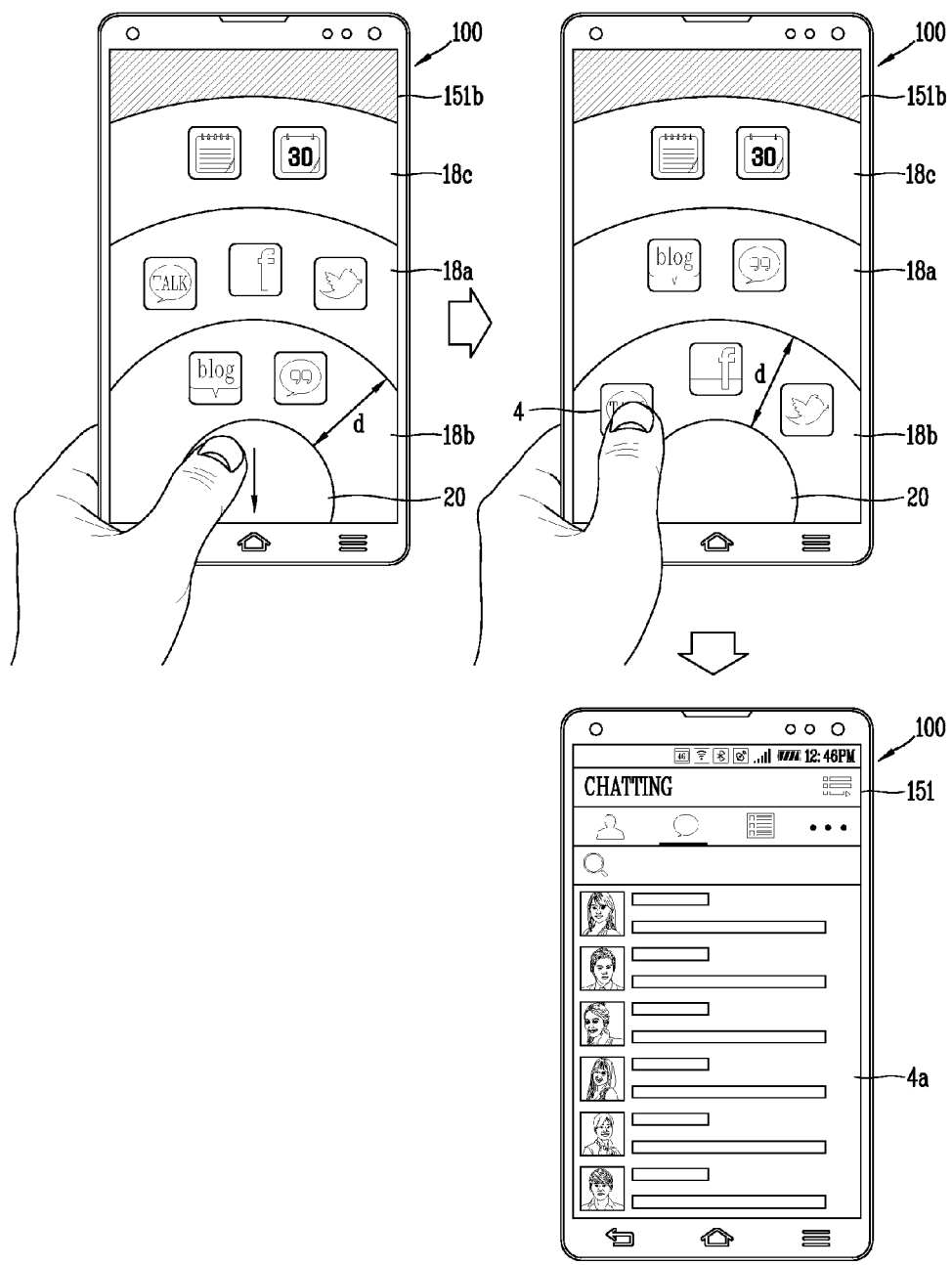
FIGS. 6A to 6C are views illustrating an embodiment to execute a function related to at least part of a plurality of sections, by utilizing a control area.
Figure 6B:
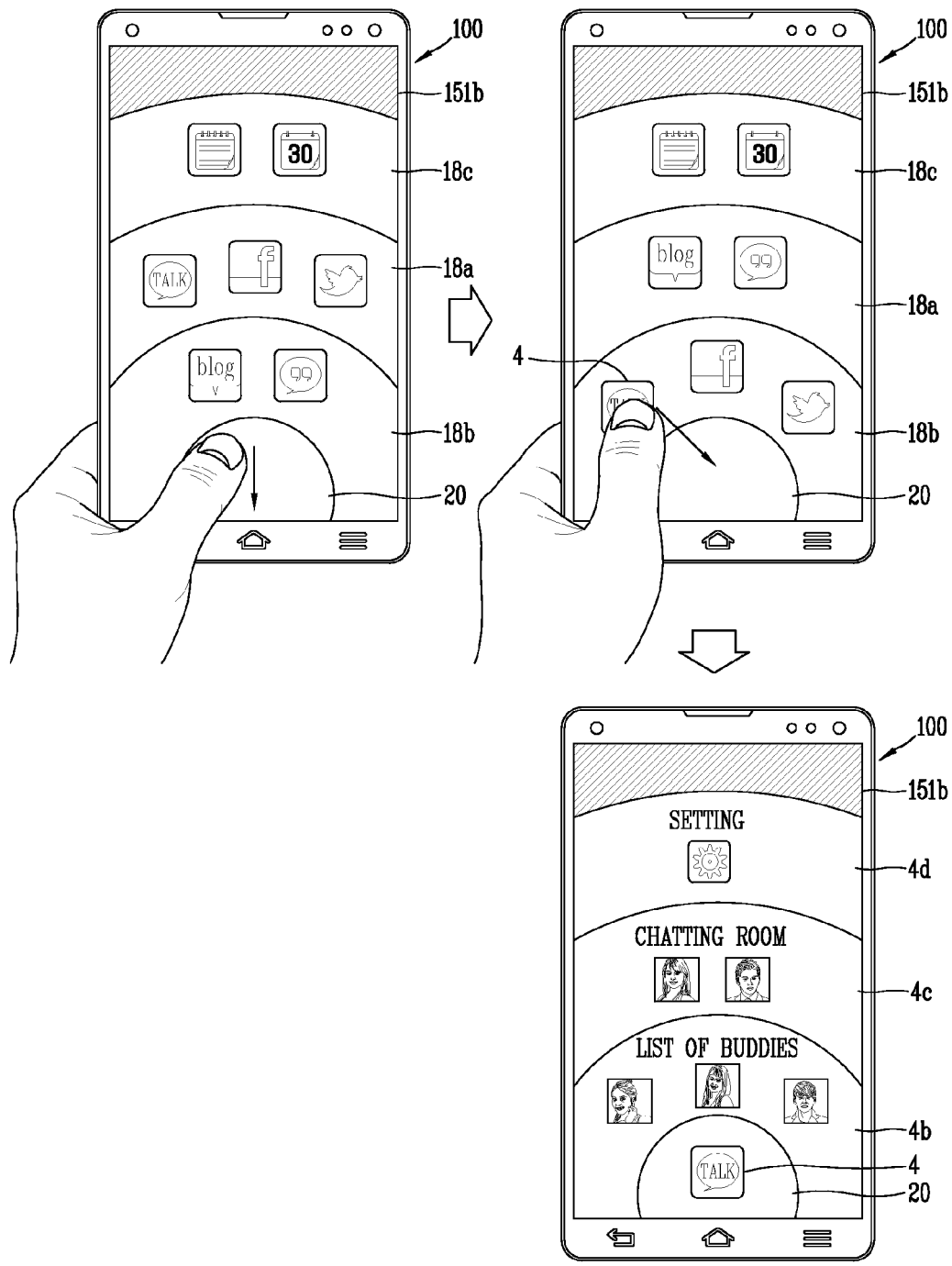
Figure 6C:
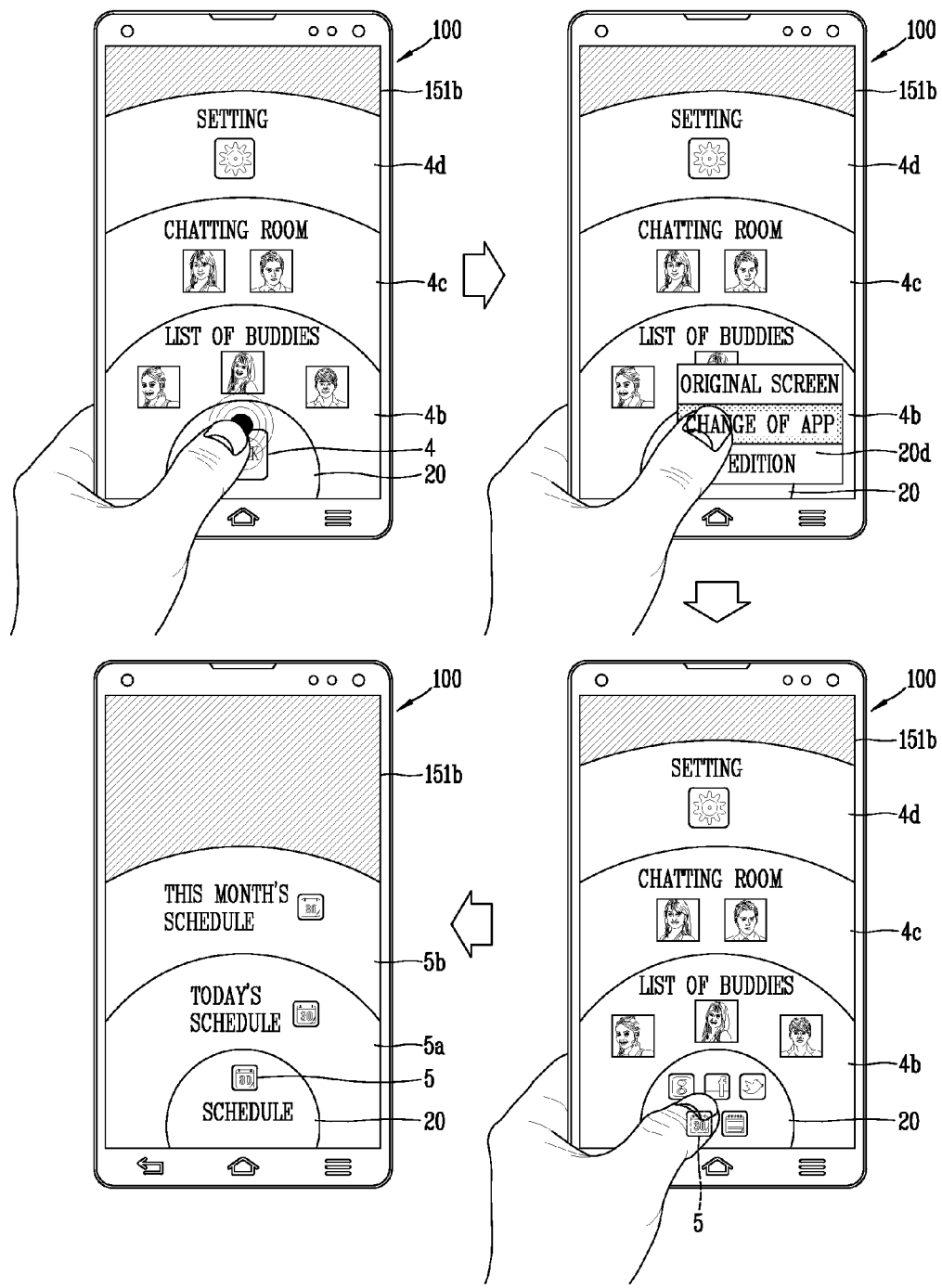

FIGS. 6A to 6C are views illustrating an embodiment to execute a function related to at least part among a plurality of sections, by utilizing the control area.

Referring to FIG. 6A, if a preset touch input is applied onto the control area 20, the controller 180 may control the touch screen 151 such that a position of at least part among a plurality of sections may be changed For instance, as shown in a second drawing of FIG. 6A, the controller 180 may interchange a position of a first section 18a closest to the control area 20, with a position of a second section 18b next to the first section 18a. In this case, the second section 18b may be positioned within a preset distance (d) from the control area 20.

As shown in a second drawing of FIG. 6A, if a touch input is applied to an object 4 included in the second section 18b, an execution screen 4a for executing a function related to the object 4 may be output to the touch screen 151.

Alternatively, as shown in the second drawing of FIG. 6B, in a state where the second section 18b is positioned within a preset distance (d) from the control area 20, a consecutive touch input (e.g., a drag touch input) may be applied to the control area 20 from the second section 18b.

In this case, the controller 180 may execute a specific function related to the second section 18b (a specific function related to the object 4). The controller 180 may control the touch screen 151 such that execution information by the execution of the specific function may be displayed on at least one of the plurality of sections 18a, 18b, 18c.

That is, as shown in a second drawing of FIG. 6B, a specific function related to the object 4 may be executed, based on a consecutive touch input applied to the control area 20 from the second section 18b (especially, the object 4) included within a preset distance from the control area 20. If the specific function corresponds to a specific application, the controller 180 may control the touch screen 151 such that the icon 4 of the specific application may be output to the control area 20, as shown in a third drawing of FIG. 6B.

The controller 180 may extract execution information by the execution of the specific function. For instance, sub menu information included in the specific application may be extracted as execution information by the execution of the specific function. As shown in a third drawing of FIG. 6B, the controller 180 may control the touch screen 151 such that sub menu information 4b, 4c, 4d included in the specific application may be displayed on the plurality of sections, respectively.

Upon execution of a specific function related to a section included within a preset distance from the control area, the controller 180 may provide a user with execution information by the execution of the specific function, by utilizing each of the plurality of sections.

If a user wishes to receive execution information about a function different from the specific function in a state where the specific function has been executed, the user may output execution information by execution of the different function to the plurality of sections, by utilizing the control area.

That is, referring to FIG. 6C, if a preset touch input is applied to the control area 20, in a state where the execution information about the specific function has been displayed on each of the plurality of sections 4b, 4c, 4d, the controller 180 may control the mobile terminal to enter an edition mode of the screen information.

The edition mode indicates a mode for executing edition with respect to the plurality of sections. In the edition mode, a setting related to the plurality of sections may be changed. For instance, the change of the setting related to the plurality of sections may mean a change of a function corresponding to at least part among the plurality of sections, a change of an output state (size, position, shape, etc.) of at least part among the plurality of sections, a change of a basis for sorting the plurality of sections from each other, etc.

Once the mobile terminal enters the edition mode, the controller 180 may provide menu information 20d for changing a setting related to the plurality of sections, as shown in a second drawing of FIG. 6C.

As shown in the second drawing of FIG. 6C, upon selection of a menu for changing an execution function, the controller 180 may control the touch screen 151 such that information about functions different from the specific function may be displayed on the control area 20. The information about functions different from the specific function may be output in the form of icons of applications corresponding to the different functions.

As shown in a third drawing of FIG. 6C, if a touch input is applied to an icon 5 among the information about the different functions, the controller 180 may execute a function corresponding to the icon 5. The controller 180 may also extract execution information by the execution of the function corresponding to the icon 5, and may display the extracted execution information on each of a plurality of sections 5a, 5b as shown in a fourth drawing of FIG. 6C.

In this case, the controller 180 may terminate the execution of the specific function and may execute the different function, based on a setting. Alternatively, the controller 180 may terminate only an output state of the execution information of the specific function, in a state where the execution of the specific function is maintained.

The controller 180 may re-arrange the plurality of sections, based on execution information extracted as the different function is executed. That is, a plurality of sections for displaying the execution information of the specific function, and a plurality of sections for displaying the execution information of the different function may be different from each other in number and size.

A user may be rapidly provided with execution information of a different function by utilizing the control area, in a state where a specific function has been executed.

In the present invention, a user may easily check information about functions executable in the mobile terminal 100, and may easily execute the functions, by applying various types of touch inputs to the control area, in a state where the screen information has been output.

The controller 180 may change an output state of a plurality of sections included in the screen information, based on a touch input applied onto the plurality of sections.

Figure 7A:
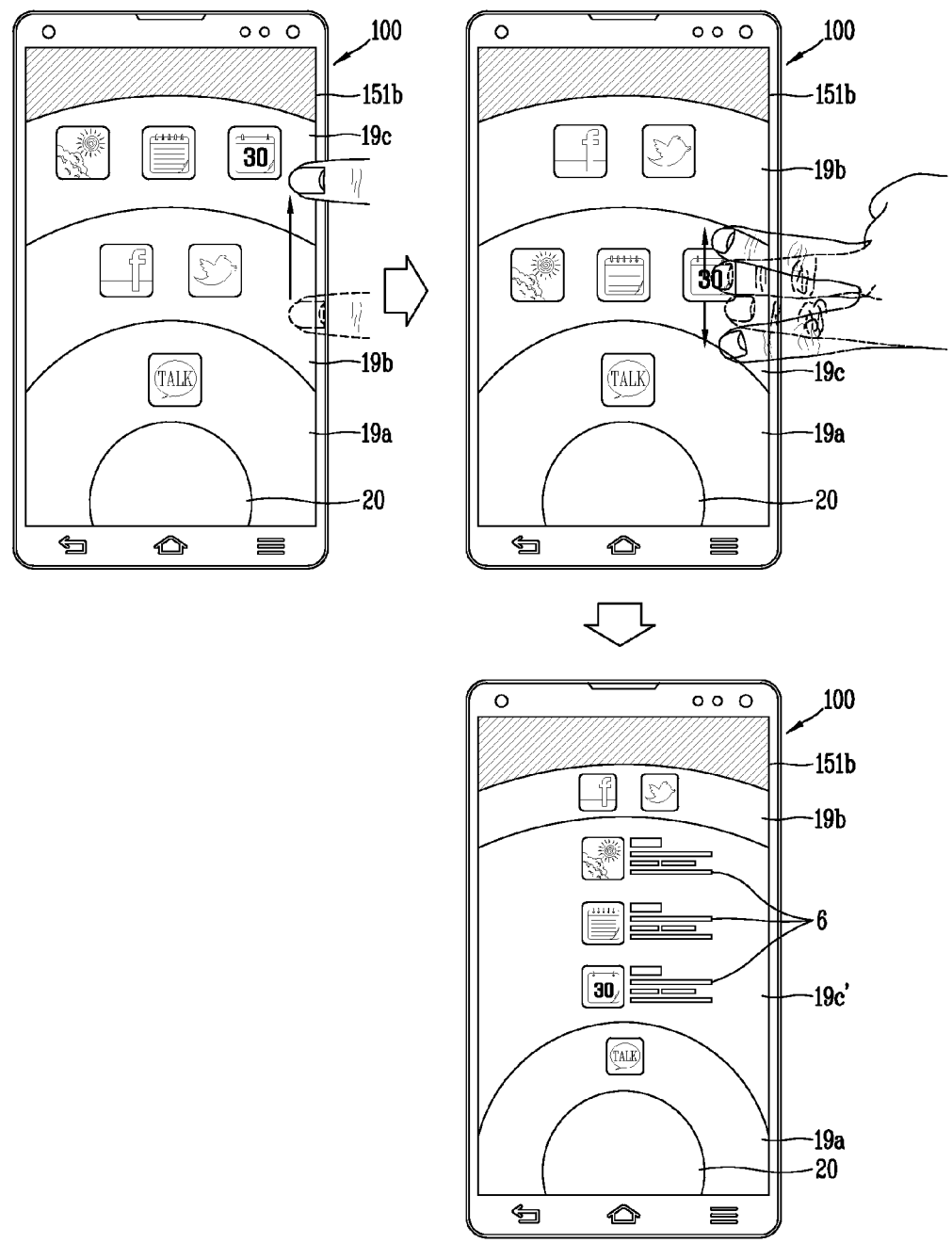
FIGS. 7A and 7B are views illustrating an embodiment to change an output state of a plurality of sections, based on a touch input applied to the plurality of sections.
Figure 7B:
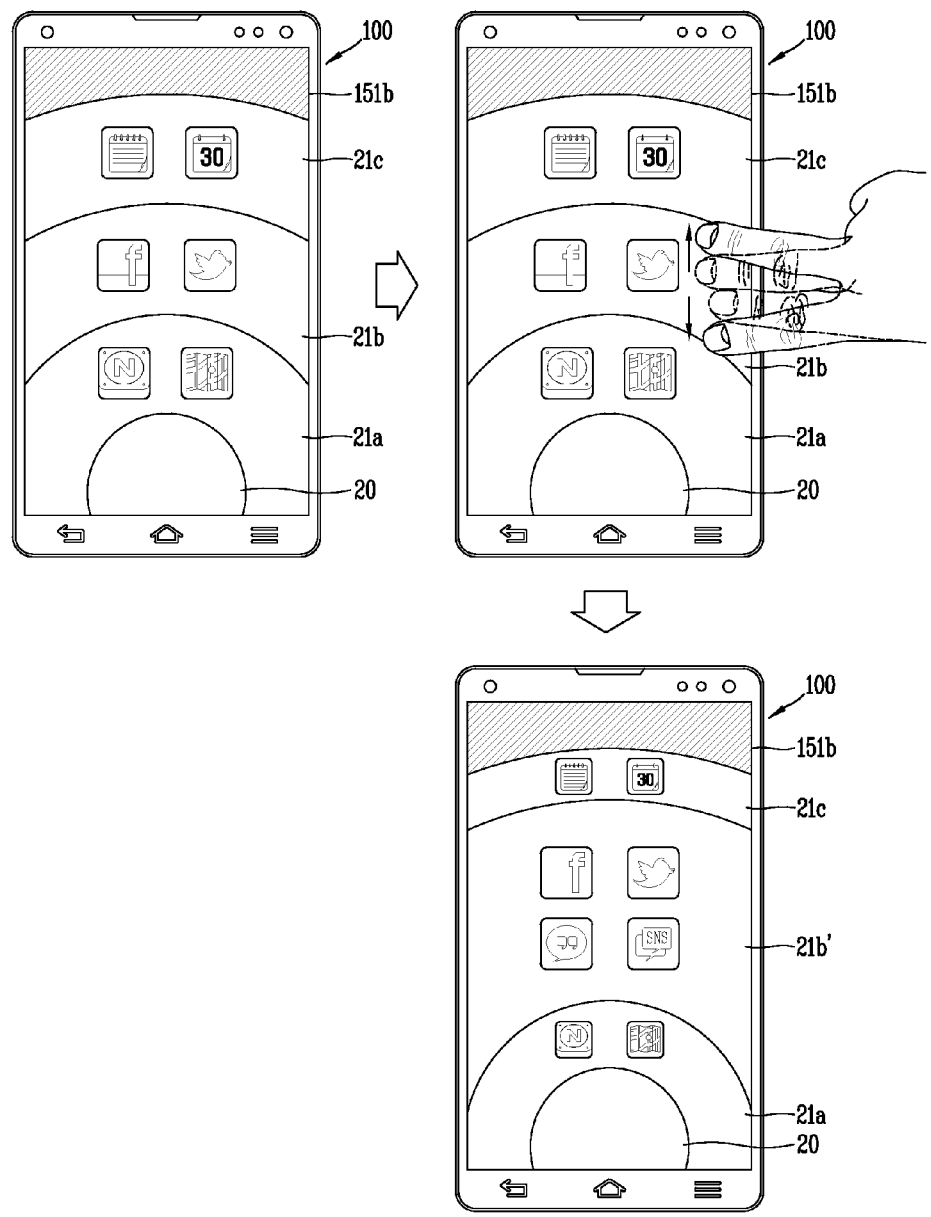

FIGS. 7A and 7B are views illustrating an embodiment to change an output state of a plurality of sections, based on a touch input applied to the plurality of sections.

Referring to FIG. 7A, in a state where screen information including a plurality of sections 19a, 19b, 19c has been output to the touch screen 151, a touch input may be applied to one section 19c among the plurality of sections 19a, 19b, 19c, as shown in a second drawing of FIG. 7A. For instance, the touch may be a pinch-out touch applied to the one section 19c.

The controller 180 may control the touch screen 151 such that the size of the one section 19c may be enlarged in response to the touch applied to the one section 19c. As shown in a third drawing of FIG. 7A, the controller 180 may control the touch screen 151 such that detailed information 6 about objects displayed on the one section 19c may be displayed on the one section 19c, in response to the enlargement of the size of the one section 19c.

For instance, the detailed information 6 about the objects may include execution information about functions related to the objects, setting information about functions related to the objects, etc.

As another example, as shown in a second drawing of FIG. 7B, if a preset touch input is applied to one section 21b among a plurality of sections 21a, 21b, 21c, the controller 180 may enlarge the size of the one section 21b. Then, the controller 180 may change an output state of objects displayed on the one section 21b, in response to the enlargement of the size of the one section 21b.

That is, as shown in a third drawing of FIG. 7B, the controller 180 may control the touch screen 151 such that objects having not displayed among objects included in the one section 21b may be additionally output, in correspondence to an enlarged degree of the one section 21b.

Thus, a user may control the mobile terminal in an intuitive manner by directly applying a touch input to a desired section among the plurality of sections, rather than by applying a preset touch input to the control area in order to control at least part of the plurality of sections.

The screen information which can be output from the mobile terminal 100 according to an embodiment of the present invention may be changed such that an output state of the plurality of sections may be changed based on other conditions.

Figure 8A:
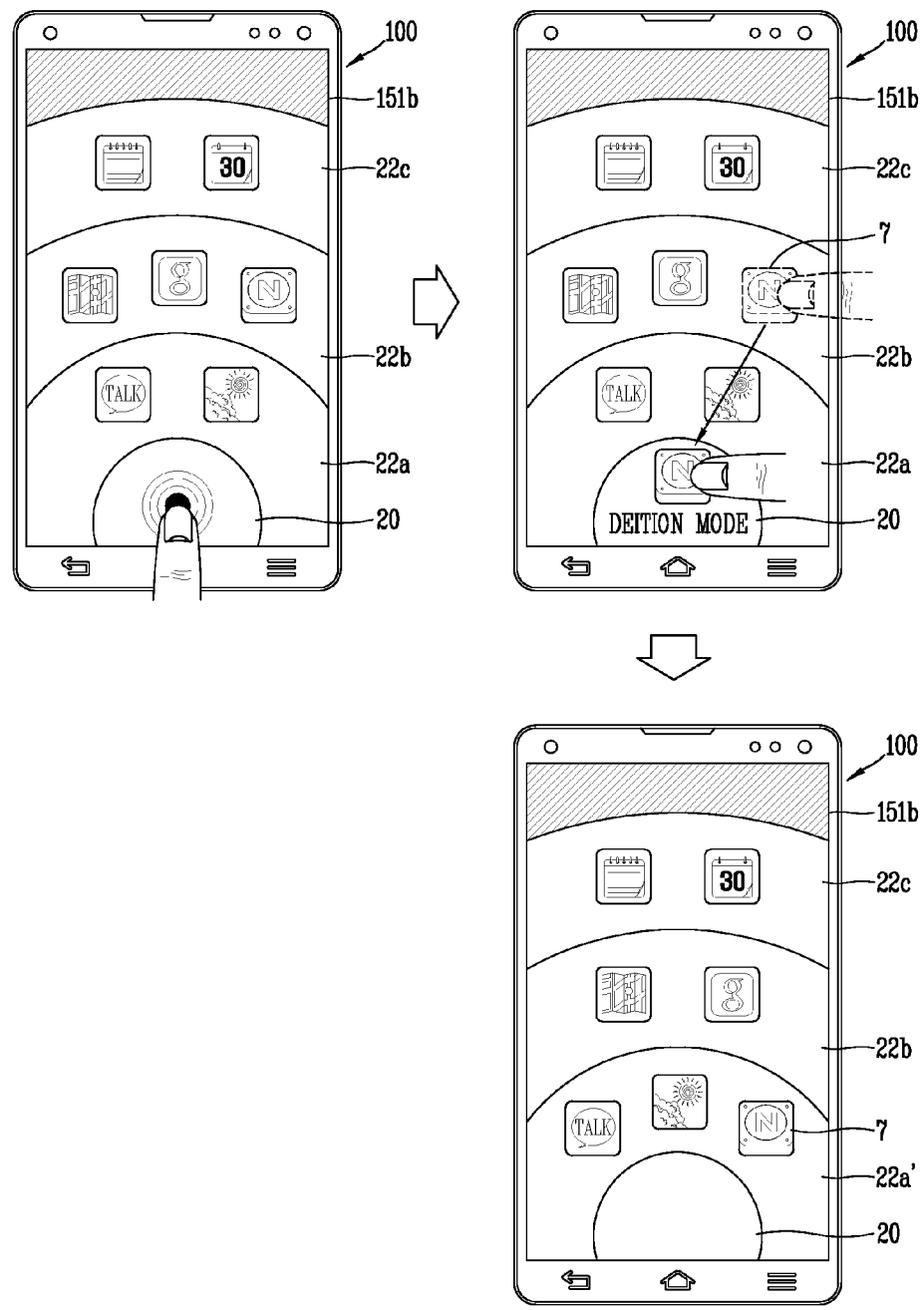
FIGS. 8A and 8B are views illustrating another embodiment to change an output state of a plurality of sections.
Figure 8B:
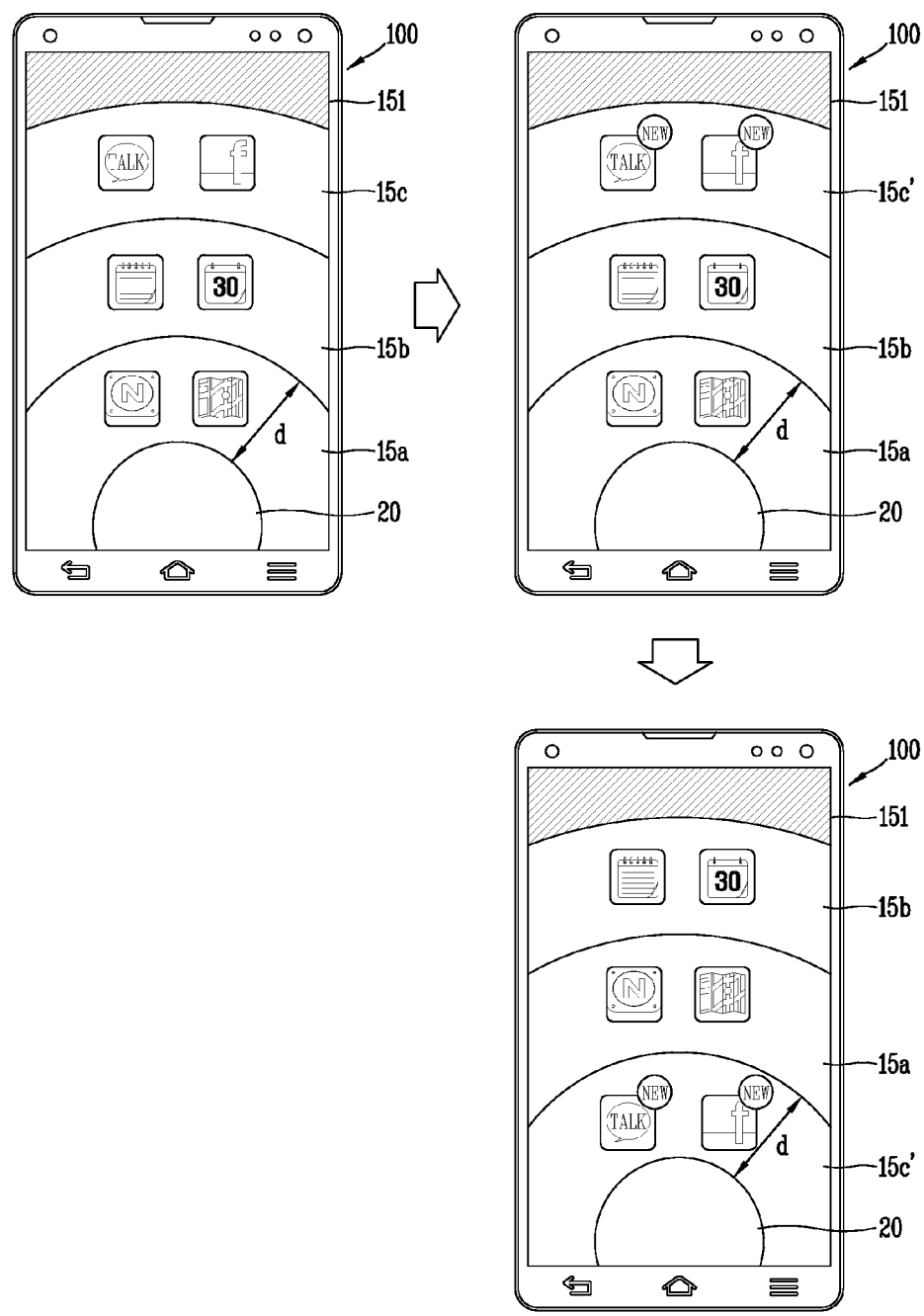

FIGS. 8A and 8B are views illustrating another embodiment to change an output state of a plurality of sections.

Referring to FIG. 8A, screen information including a plurality of sections 22a, 22b, 22c corresponding to different categories may be output to the touch screen 151. An icon of an application related to a category corresponding to each of the plurality of sections 22a, 22b, 22c, may be included in each of the plurality of sections 22a, 22b, 22c.

Once a preset touch input is applied to the control area 20 as shown in a first drawing of FIG. 8A, the mobile terminal may enter an edition mode with respect to the screen information as shown in a second drawing of FIG. 8A. The edition mode may indicate a mode to change an output state of at least part among the plurality of sections 22a, 22b, 22c.

As shown in a second drawing of FIG. 8A, in the edition mode, a consecutive touch input may be applied to the control area 20, from an object 7 included in one section 22b among the plurality of sections 22a, 22b, 22c. In this case, the controller 180 may compare a function related to the object 7, with categories corresponding to other sections 22a, 22c different from the one section 22b where the object 7 has been included. Then, the controller 180 may select one section having a similar attribute to the function related to the object 7.

For instance, the attribute may mean one of a function type, a usage frequency with respect to a function, execution information by execution of a function, and setting information. More specifically, the plurality of sections may include a first section corresponding to a messenger function, a second section 22b corresponding to a search function, and a third section 22c corresponding to a schedule management function.

If the function related to the object 7 corresponds to an Internet search function included in the second section 22b, the controller 180 may select a function having a similar attribute to the Internet search function, between the messenger function and the schedule management function. For instance, the controller 180 may select the messenger function executed through a wireless communication with an external server or an external mobile terminal, like the Internet search function.

As shown in a third drawing of FIG. 8A, the controller 180 may control the touch screen 151 such that the object 7 may be included in the first section 22a corresponding to the messenger function, based on release of the consecutive touch input.

The mobile terminal according to another embodiment of the present invention may change an output state of the plurality of sections, by moving one object included in one section to another section, by analyzing an attribute of a function related to the object in the edition mode.

As another example, in a state where screen information including the control area 20 and a plurality of sections 15a, 15b, 15c has been output as shown in a first drawing of FIG. 8B, a new event may occur on one section 15c between sections 15b, 15c not adjacent to the control area 20, as shown in a second drawing of FIG. 8B. In this case, the controller 180 may control the touch screen 151 such that the one section 15c may be changed into a section 15c' where information indicating the occurrence of the new event has been displayed.

As shown in a third drawing of FIG. 8B, the controller 180 may control the touch screen 151 such that the section 15c' where information indicating the occurrence of the new event has been displayed, may be positioned within a preset distance (d) from the control area 20.

Thus, a user may check information about a newly-occurred event in a more convenient manner, without applying an additional touch input to the control area.

The mobile terminal and the control method thereof according to one embodiment of the present invention may have the following advantages.

Firstly, since various functions executable in the mobile terminal are provided to single screen information in a sorted manner based on a preset reference, a user may check the various functions at a glance through the screen information.

Secondly, the mobile terminal provides a user interface to control the various functions included in the screen information, while it is held in one hand of a user. Thus, the user may execute the various functions in an easier and more convenient manner.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a touch screen; and
a controller configured to:
receive a touch input via the touch screen;
set a control area including a location of the touch input, wherein a position of the control area is determined based on the location of the touch input;
control the touch screen to display a control area image representing the set control area, wherein the control area image is displayed at the location of the touch input; and
control the touch screen to divide a remaining region excluding the control area into a plurality of sections which are positioned increasingly further from the control area image, wherein the plurality of sections comprises a first section and a second section and the first section is positioned closest to the control area image within a preset distance and the second section is positioned further from the control area image than the first section, and wherein each of the plurality of sections comprises at least one object each corresponding to a different application;
receive a first specific touch input applied to the control area image; and
control the touch screen to change positions of the first section and second section in response to the first specific touch input such that the second section is positioned within the preset distance from the control area image and the first section is positioned beyond the preset distance from the control area image in response to the first specific touch input.

2. The mobile terminal of claim 1, wherein a number of the plurality of sections is based on a preset reference.

3. The mobile terminal of claim 2, wherein
the at least one object of each section is sorted based on the preset reference; and
wherein the controller is further configured to execute a function related to a selected object of the at least one object in response to a selection touch input to the selected object.

4. The mobile terminal of claim 3, wherein the at least one object includes at least: an icon corresponding to an application executable in the mobile terminal; a widget corresponding to a specific function; a text or an image including specific information; or a graphic object including event-occurrence information.

5. The mobile terminal of claim 1, wherein the controller is further configured to control the touch screen to interchange positions of the first section and the second section in response to the first specific touch input to the control area image.

6. The mobile terminal of claim 1, wherein the controller is further configured to control the touch screen to reduce a size of each of the plurality of sections by a corresponding preset size in response to a second specific touch input, such that all of the plurality of sections are positioned within the preset distance.

7. The mobile terminal of claim 6, wherein the controller is further configured to control the touch screen to display summary information about a corresponding related function in each of the plurality of reduced-size sections.

8. The mobile terminal of claim 1, wherein the controller is further configured to:
control the touch screen to specify one of the plurality of sections in response to a second specific touch input; and
control the specified section based on a third specific touch to the control area image.

9. The mobile terminal of claim 8, wherein the controller is further configured to control the touch screen to display:
a specific object in the specified section for executing a first function related to the specified section in response to a fourth specific touch input, and another object in the specified section to replace the specific object in response to another touch input to the control area image in a preset direction.

10. The mobile terminal of claim 9, wherein:
the another object is associated with a second function of a plurality of functions related to the specified section, and
the controller is further configured to execute the second function in response to a fifth touch input to the control area image while the another object is displayed.

11. The mobile terminal of claim 10, wherein the controller is further configured to control the touch screen to display preview information of an execution screen of the second function in at least one region of the touch screen while the fifth touch input is maintained.

12. The mobile terminal of claim 8, wherein the controller is further configured to control the touch screen to:
display information about a function related to the specified section in the specified section;
change a size of the specified section based on a fourth touch input to the control area image; and
change an output state of the displayed information about the function as the size of the specified section is changed.

13. The mobile terminal of claim 12, wherein the controller is further configured to control the touch screen to:
increase a size of the specified section based on the fourth touch input; and
display detailed information about the function related to the specified section based on an amount the size of the specified section is increased.

14. The mobile terminal of claim 1, wherein the controller is further configured to:
execute a specific function related to a specific section displayed within the preset distance in response to a drag touch input from the specific section to the control area image; and
control the touch screen to display execution information of the specific function in at least one section of the plurality of sections.

15. The mobile terminal of claim 14, wherein the controller is further configured to control the touch screen to display sub menu information of a specific application associated with the specific function in one or more sections of the plurality of sections.

16. A display method for a mobile terminal having a touch screen, the method comprising:
receiving a touch input via the touch screen;
setting a control area including a location of the touch input, wherein a position of the control area is determined based on the location of the touch input;
displaying a control area image representing the set control area, wherein the control area image is displayed at the location of the touch input; and
dividing a remaining region excluding the control area into a plurality of sections which are positioned increasingly further from the control area image, wherein the plurality of sections comprises a first section and a second section and the first section is positioned closest to the control area image within a preset distance and the second section is positioned further from the control area image than the first section, and wherein each of the plurality of sections comprises at least one object each corresponding to a different application;
receiving, via the touch screen, a first specific touch input applied to the control area image; and
changing positions of the first section and second section in response to the first specific touch input such that the second section is positioned within the preset distance from the control area image and the first section is positioned beyond the preset distance from the control area image in response to the first specific touch input.

17. The method of claim 16, wherein a number of the plurality of sections is based on a preset reference.

18. The method of claim 17,
wherein the at least one object of each section is sorted based on the preset reference; and
the method further comprises executing a function related to a selected object of the at least one object in response to a selection touch input to the selected object.

19. The method of claim 18, wherein the at least one object includes at least: an icon corresponding to an application executable in the mobile terminal; a widget corresponding to a specific function; a text or an image including specific information; or a graphic object including event-occurrence information.

* * * * *